United States Patent
Shishido

(10) Patent No.: US 9,823,436 B2
(45) Date of Patent: Nov. 21, 2017

(54) LENS BARREL

(71) Applicant: Olympus Corporation, Shibuya-ku, Tokyo (JP)

(72) Inventor: Hiroyuki Shishido, Hachioji (JP)

(73) Assignee: Olympus Corporation, Tokyo (JP)

(*) Notice: Subject to any disclaimer, the term of this patent is extended or adjusted under 35 U.S.C. 154(b) by 0 days.

(21) Appl. No.: 14/955,495

(22) Filed: Dec. 1, 2015

(65) Prior Publication Data

US 2016/0154197 A1 Jun. 2, 2016

(30) Foreign Application Priority Data

Dec. 2, 2014 (JP) .................................. 2014-244293

(51) Int. Cl.
    *G02B 7/02* (2006.01)
(52) U.S. Cl.
    CPC .................................... *G02B 7/023* (2013.01)
(58) Field of Classification Search
    CPC ........ G02B 7/003; G02B 7/004; G02B 7/005; G02B 7/02; G02B 7/023; G02B 7/026; G02B 7/028; G02B 7/10; G02B 7/022; G02B 27/646
    See application file for complete search history.

(56) References Cited

U.S. PATENT DOCUMENTS

| | | | | |
|---|---|---|---|---|
| 6,909,558 B2 * | 6/2005 | Orimo | .................... | G02B 7/023 353/101 |
| 2001/0009071 A1 * | 7/2001 | Iikawa | .................... | G02B 7/023 33/645 |
| 2004/0109243 A1 | 7/2004 | Orimo | | |
| 2005/0115358 A1 * | 6/2005 | Hamasaki | ................ | G02B 7/08 74/640 |
| 2007/0236808 A1 * | 10/2007 | Morita | .................... | G02B 7/021 359/700 |

FOREIGN PATENT DOCUMENTS

| | | |
|---|---|---|
| CN | 101210993 A | 7/2008 |
| JP | 2008-170889 | 7/2008 |
| JP | 2008170889 A * | 7/2008 |
| JP | 2008-216906 | 9/2008 |

OTHER PUBLICATIONS

Machine Translation of Hidenori (JP2008-170889A).*
First Office Action to corresponding Chinese Patent Application No. 201510862430.9, dated Aug. 2, 2017 (6 pgs.).

* cited by examiner

*Primary Examiner* — Thomas K Pham
*Assistant Examiner* — Cara Rakowski
(74) *Attorney, Agent, or Firm* — John C. Pokotylo; Pokotylo Patent Services

(57) ABSTRACT

A lens barrel includes: a first barrel; a second barrel that, with respect to the first barrel, is capable of relative movement in a direction orthogonal to the optical axis; an adjustment member for adjusting an amount of the relative movement; two adjustment member housing portions that are provided in a diametral space between the first barrel and the second barrel, are formed so as to be separate from each other in a circumferential direction and are capable of housing the adjustment member; a plurality of screws; a plurality of fastening portions for threadedly engaging and fastening the first barrel and the second barrel in parallel with the optical axis by means of the plurality of screws; and one washer member that is held in an integral manner between the plurality of screws and the plurality of fastening portions.

10 Claims, 7 Drawing Sheets

LENS BARREL

CROSS REFERENCE TO RELATED APPLICATION

This application claims the benefit of Japanese Application No. 2014-244293 filed in Japan on Dec. 2, 2014, the contents of which are incorporated herein by this reference.

BACKGROUND OF THE INVENTION

1. Field of the Invention

This invention is a technical innovation that relates to simplification and improvement of alignment accuracy of an alignment (optical axis alignment) structure of an image pickup optical system in a lens barrel.

2. Description of Related Art

Conventionally, a lens barrel that is applied to an image pickup apparatus such as a camera is constituted by an image pickup optical system including a plurality of optical lenses, a plurality of cylindrical or annular barrel members and a drive mechanism and the like. Among these, the plurality of barrel members include, for example, lens holding barrels that are configured to hold a plurality of lens groups constituting the image pickup optical system, respectively, and to enable advancing/retreating movement in a direction along the optical axis for focusing or zooming.

For a conventional lens barrel, to maintain the optical performance of the image pickup optical system, assembly is performed after adjusting the eccentricity of the optical axis center of the plurality of lens groups and performing alignment (optical axis alignment) in order to substantially match the optical axes of the respective lens groups. Consequently, as disclosed, for example, in Japanese Patent Application Laid-Open Publication No. 2008-216906 and Japanese Patent Application Laid-Open Publication No. 2008-170889, various structures have been proposed for performing alignment of a plurality of lenses constituting an image pickup optical system in a conventional lens barrel.

In a lens barrel disclosed in the aforementioned Japanese Patent Application Laid-Open Publication No. 2008-216906, alignment of lenses is performed by pressure welding and fixing a plurality of lens holding barrels using countersunk head screws.

A lens barrel disclosed in the aforementioned Japanese Patent Application Laid-Open Publication No. 2008-170889 includes: a lens frame; a holding barrel including a flange piece having opposing faces orthogonal to each other and protruding in an optical axis direction in a manner that opposes an outer circumferential face of the lens frame; a holding plate held between the outer circumferential face of the lens frame and the flange piece of the holding barrel; an adjustment plate provided on the holding plate; and a plate spring that is provided at a position facing the holding plate with the optical axis interposed between the plate spring and the holding plate, and that urges the lens frame in the holding plate direction from the outer circumferential face side; in which the lens barrel is configured so that eccentricity adjustment can be performed in a direction orthogonal to the optical axis by exchanging adjustment plates that have different thicknesses. In this case, a configuration is adopted that urges the lens frame by means of an urging member (a plate spring or a countersunk head screw or the like) to thereby press the adjustment plate.

SUMMARY OF THE INVENTION

A lens barrel according to one aspect of the present invention includes: a first barrel; a second barrel that, with respect to the first barrel, is capable of relative movement in a direction orthogonal to an optical axis; an adjustment member for adjusting an amount of the relative movement; two adjustment member housing portions that are provided in a diametral space between the first barrel and the second barrel, are formed so as to be separate from each other in a circumferential direction and are capable of housing the adjustment member; a plurality of screws; a plurality of fastening portions for threadedly engaging and fastening the first barrel and the second barrel in parallel with the optical axis by means of the plurality of screws; and one washer member that is held in an integral manner between the plurality of screws and the plurality of fastening portions.

Advantages of this invention will become more apparent from the following detailed description.

DETAILED DESCRIPTION OF THE PREFERRED EMBODIMENTS

Figure 1:
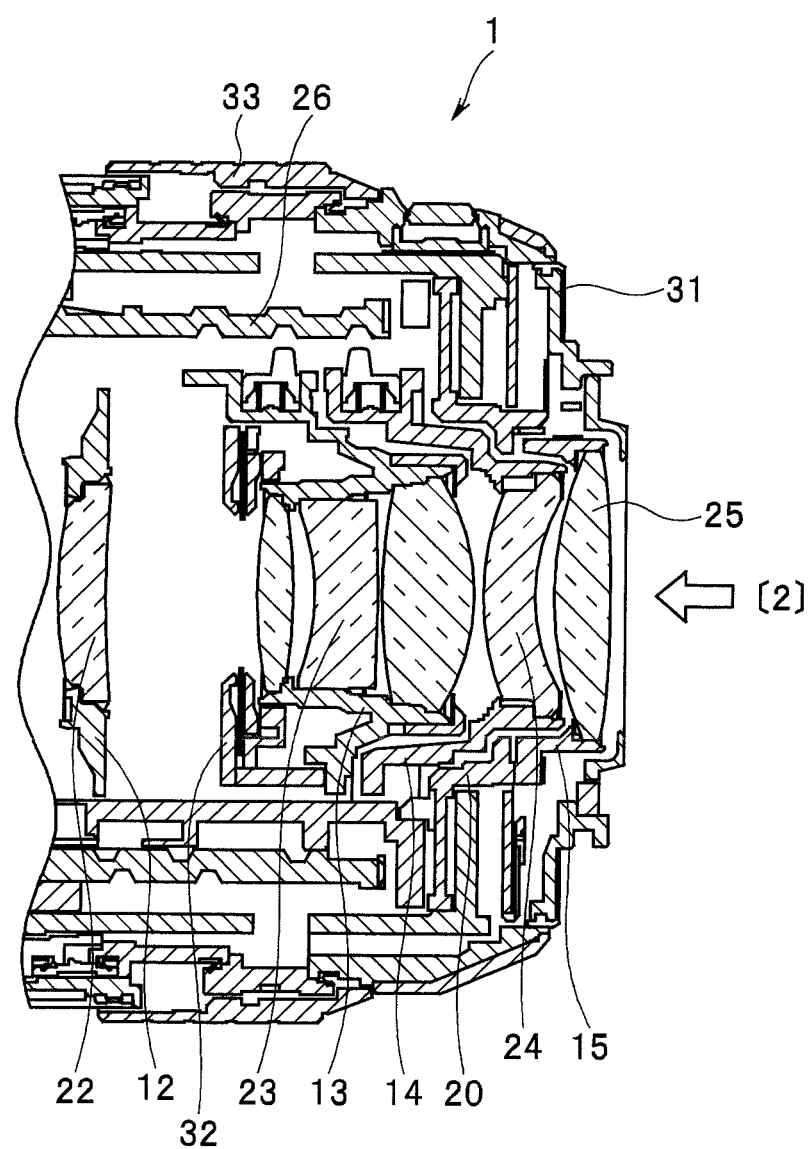
FIG. 1 is a longitudinal sectional view at a face along an optical axis of a lens barrel of one embodiment of the present invention.

The present invention is described hereunder by way of an embodiment that is illustrated in the accompanying drawings. One embodiment of the present invention is an embodiment that takes as an example a lens barrel that is applied to an image pickup apparatus (hereunder referred to simply as "camera") such as a camera that is configured to be capable of, for example, using a solid-state image pickup device to perform photoelectric conversion of an optical image formed by an optical lens, converting an image signal obtained thereby into digital image data that represents a still image or a movie, recording digital data generated in this manner on a recording medium, and reproducing and displaying a still image or a movie on a display apparatus based on the digital image data recorded on the recording medium.

Further, in the present embodiment, an optical axis of an image pickup optical system in the lens barrel is represented by the symbol "O". In a direction along the optical axis O, a side on which an object that faces the front face of the lens barrel is present is referred to as "front", and a side on which a light receiving face (image forming face) of an image pickup device that is disposed on a back face side of the lens barrel is present is referred to as "rear".

Note that the respective components in the respective drawings used for the following description may be displayed using a different contraction scale for each of the components so as to be shown in a size that is recognizable in the drawings. Accordingly, the present invention is not limited to only the quantity of components, the shapes of components, the ratios between the sizes of components, and the relative positional relationship between the respective components illustrated in the drawings.

FIG. 1 is a longitudinal sectional view at a face along an optical axis of a lens barrel of one embodiment of the present invention. Note that, in FIG. 1, only one portion (rear half portion) of the lens barrel of the present embodiment is shown.

Figure 2:
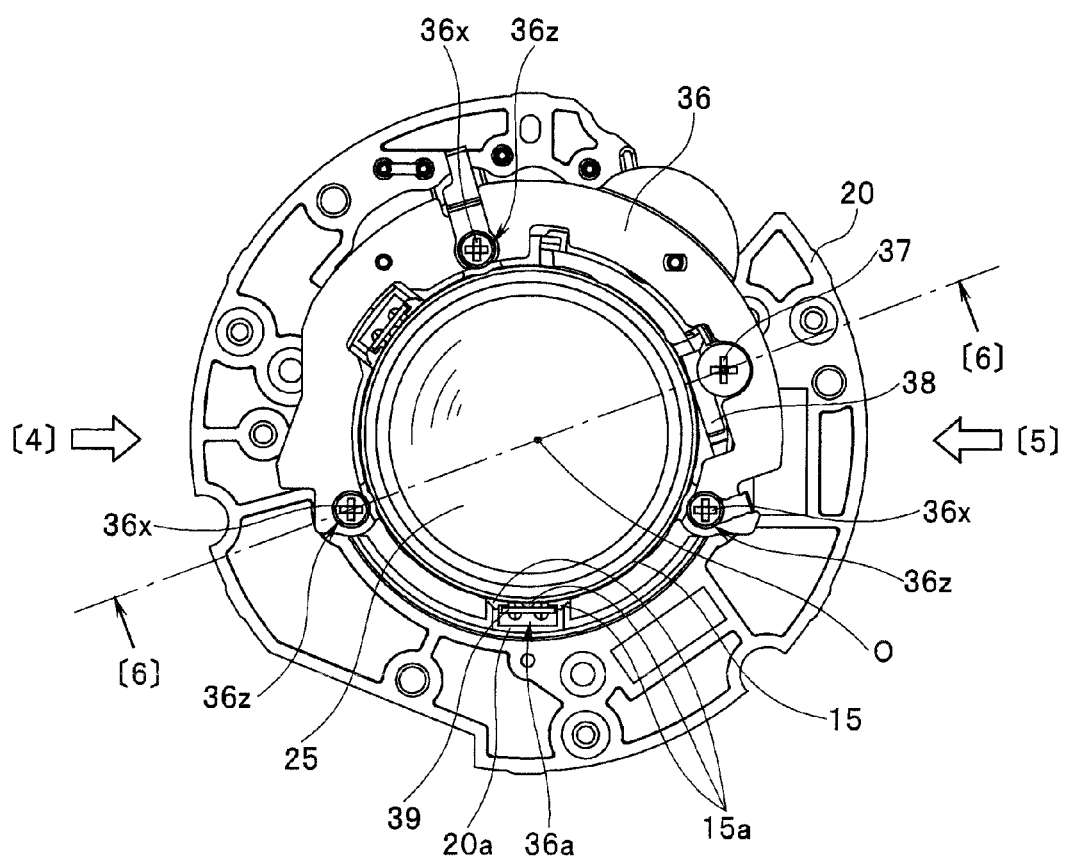
FIG. 2 is a plan view as seen from a back face side (direction of arrow [2] in FIG. 1) showing some constituent members (a fixed barrel and a fifth group lens frame) that are taken out from among a plurality of barrel members constituting the lens barrel in FIG. 1.
Figure 3:
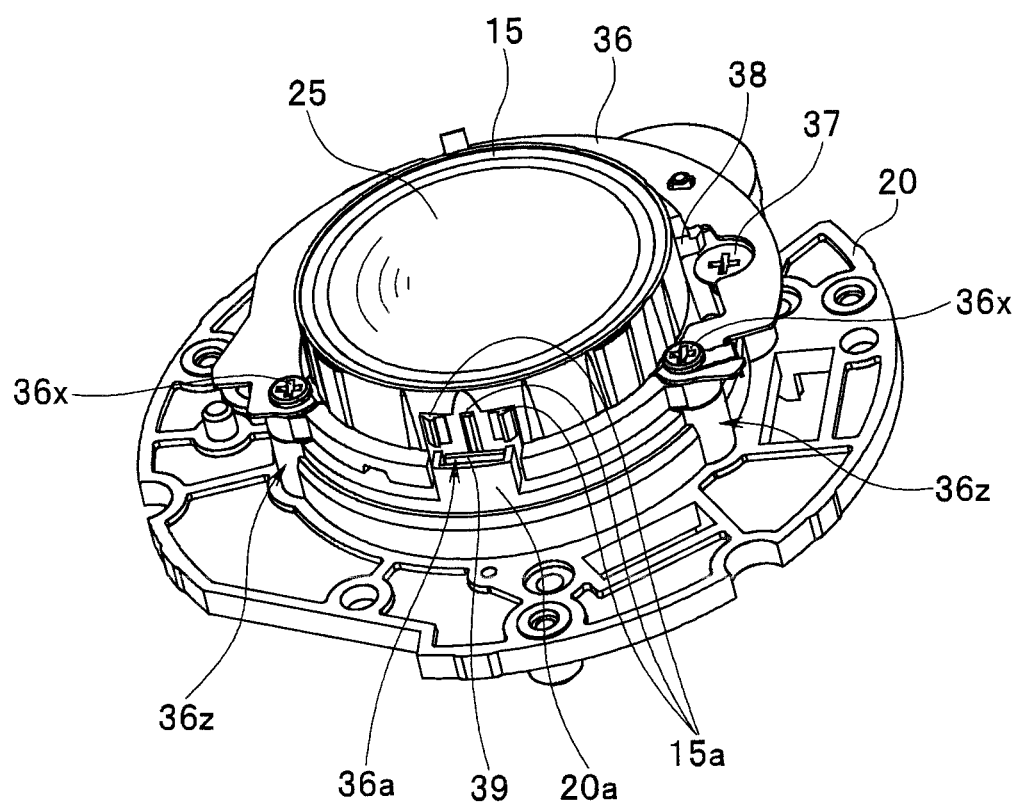
FIG. 3 is a perspective view of FIG. 2.
Figure 4:
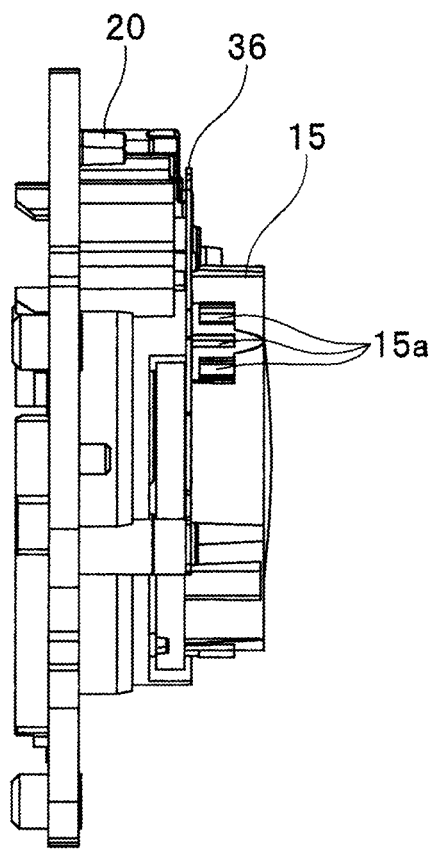
FIG. 4 is a left side view as seen from an arrow [4] direction in FIG. 2.
Figure 5:
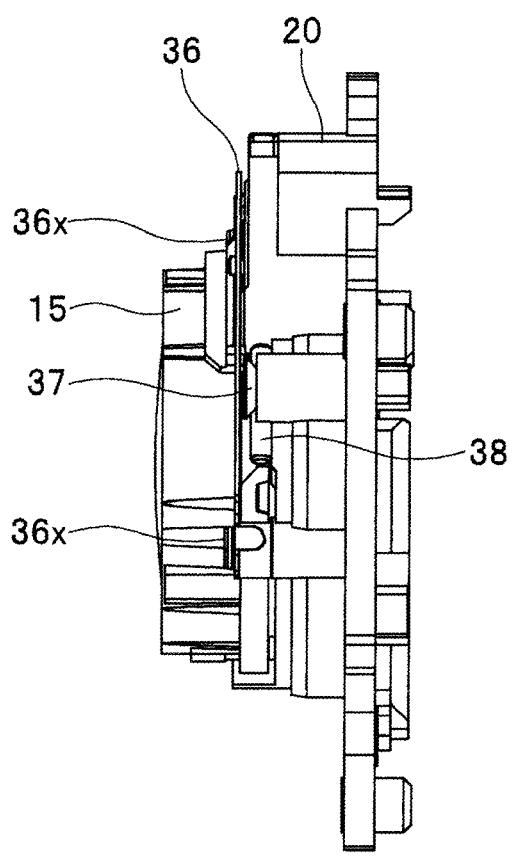
FIG. 5 is a right side view as seen from an arrow [5] direction in FIG. 2.
Figure 6:
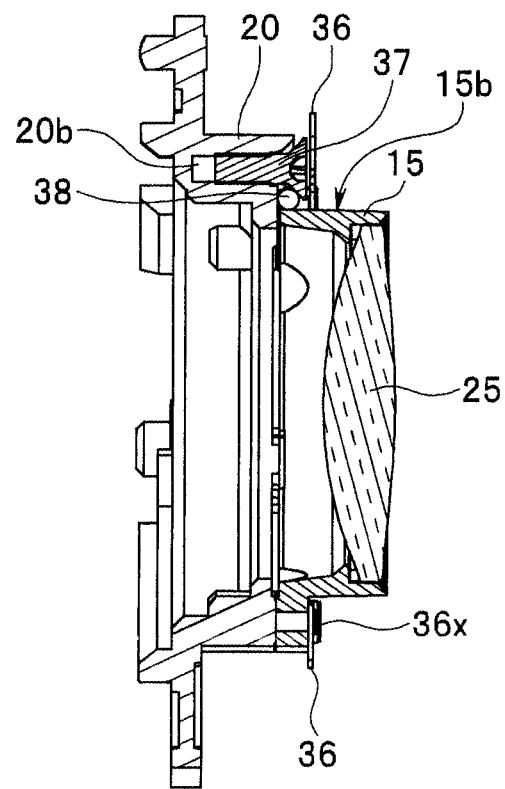
FIG. 6 is a longitudinal sectional view along a line [6]-[6] in FIG. 2.
Figure 7:
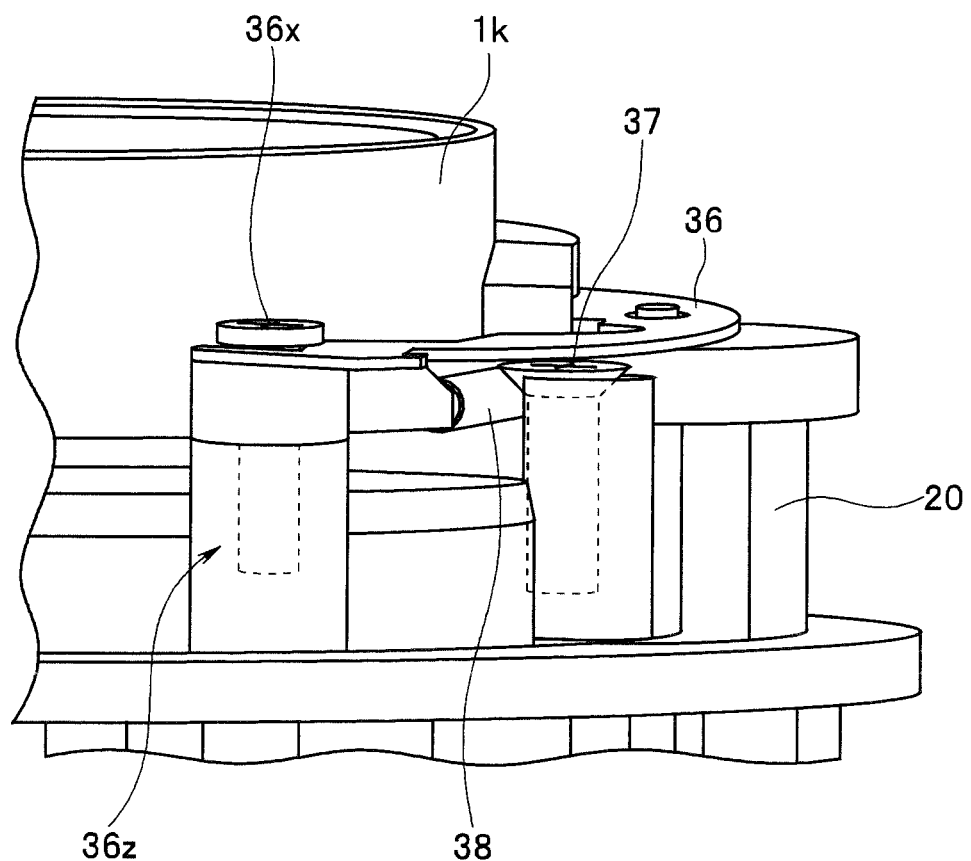
FIG. 7 is an enlarged perspective view of principal portions that illustrates, in an enlarged manner, principal portions (arrangement locations of a countersunk head screw and a rolling member) of an alignment mechanism in the lens barrel shown in FIG. 1.

FIG. 2 to FIG. 6 are views that illustrate some constituent members, namely, a fixed barrel and a fifth group lens frame, among a plurality of barrel members constituting the lens barrel of the present embodiment. FIG. 2 to FIG. 6 illustrate the fixed barrel and the fifth group lens frame in a state in which the fixed barrel and the fifth group lens frame have been taken out from the lens barrel as they are in an assembled state. Among these drawings, FIG. 2 is a plan view as seen from a back face side (arrow [2] direction in FIG. 1). FIG. 3 is a perspective view of FIG. 2. FIG. 4 is a left side view as seen from an arrow [4] direction in FIG. 2. FIG. 5 is a right side view as seen from an arrow [5] direction in FIG. 2. FIG. 6 is a longitudinal sectional view along a line [6]-[6] in FIG. 2. Further, FIG. 7 is an enlarged perspective view of principal portions that illustrates, in an enlarged manner, principal portions of an alignment mechanism of some constituent members (the fixed barrel and the fifth group lens frame) in the lens barrel of the present embodiment, and particularly the arrangement locations of a countersunk head screw and a rolling member. Note that, in FIG. 2 to FIG. 7, among the internal structure of the lens barrel, in order to particularly show the structure of the alignment mechanism of the fifth group lens holding barrel, the illustration of other constituent members such as a lens mount ring is omitted from the drawings.

First, the schematic configuration of the lens barrel of the present embodiment is briefly described hereunder using FIG. 1. A lens barrel 1 of the present embodiment is constituted by various constituent members that include: an image pickup optical system that forms a plurality of lens groups by means of a plurality of optical lenses; a plurality of lens holding barrels that hold the plurality of lens groups; a barrel member for driving that includes a drive mechanism for causing some lens holding barrels among the plurality of lens holding barrels to perform an advancing/retreating movement in a direction along the optical axis O; a barrel member for fixing that is used for fixedly holding the other lens holding barrels among the plurality of lens holding barrels; a lens mount ring that is a connecting member that enables attachment/detachment of the lens barrel 1 to/from the front face of a camera body (not illustrated in the drawings); a diaphragm mechanism that adjusts a light amount that passes through the image pickup optical system; and other drive mechanisms or the like. As described above, only some of these constituent members, more specifically, only the rear half portion of the lens barrel 1, are illustrated in FIG. 1. Note that, as one form of the lens barrel of the present embodiment, an example is described of a lens barrel that is applied to a so-called "interchangeable lens-type camera" that is configured to include a lens mount ring that is a connecting member that enables attachment/detachment of the lens barrel 1 to/from the front face of a camera body (not illustrated in the drawings).

The image pickup optical system in the lens barrel 1 of the present embodiment is constituted by, for example, five lens groups, and the plurality of lens groups are disposed side-by-side along the optical axis O in the order of a first lens group (not illustrated in the drawings), a second lens group 22, a third lens group 23, a fourth lens group 24 and a fifth lens group 25 from the front face side. Among these lens groups, the first lens group, the fourth lens group 24, and the fifth lens group 25 are fixed lens groups. The second lens group 22 and the third lens group 23 are movable lens groups that are provided so as to be capable of advancing/retreating movement in a direction along the optical axis O, and contribute to focusing and zooming.

The first lens group (not illustrated in the drawings) is fixedly held by a first group lens holding barrel (not illustrated in the drawings) The first group lens holding barrel is fixedly held by a barrel member for fixing (not illustrated in the drawings). The second lens group 22 is fixedly held by a second group lens holding barrel 12. The third lens group 23 is fixedly held by a third group lens holding barrel 13. In this case, the second group lens holding barrel 12 and the third group lens holding barrel 13 are each extended so as to be capable of advancing/retreating in a direction along the optical axis O by means of a guide shaft or the like, and are configured to be capable of advancing/retreating movement in the direction along the optical axis O by means of, for example, a barrel member for driving such as a cam barrel 26. Note that, since an advancing/retreating mechanism or the like of the second group lens holding barrel 12 and the third group lens holding barrel 13 is a portion that is not directly related to the present invention, a description and illustration of the detailed configuration of the advancing/retreating mechanism is omitted herein. The fourth lens group 24 is fixedly held by a fourth group lens holding barrel 14. The fourth group lens holding barrel 14 is fixedly held by a fixed barrel 20 that is a first barrel that is a barrel member for fixing.

Further, the fifth lens group 25 is fixedly held by a fifth group lens holding barrel 15. The fifth group lens holding barrel 15 is also fixedly held by the fixed barrel 20 (first barrel). In this case, the fifth group lens holding barrel 15 is a second barrel that is provided so as to be capable of relative movement in a direction orthogonal to the optical axis O with respect to the aforementioned fixed barrel 20 (first barrel), and is a barrel to be aligned when performing optical axis alignment (described in detail later).

Note that, with regard to other constituent members constituting the lens barrel 1 of the present embodiment, for example, the lens mount ring 31, the diaphragm mechanism 32, and a plurality of operation rings (for example, a zoom operation ring 33) provided on the outermost circumferential face of the barrel member for fixing, since such constituent members do not directly relate to the present invention, a description the other constituent members is omitted herein.

In the present embodiment, an alignment (optical axis alignment) mechanism with respect to the fixed barrel 20 (barrel member for fixing; first barrel) of the fifth group lens holding barrel 15 (fixed lens group; second barrel) among the plurality of lens groups constituting the image pickup optical system of the lens barrel 1 is described as an example hereunder.

First, in the lens barrel 1 of the present embodiment, the fixed barrel 20 (first barrel) constitutes one part of a barrel member for fixing that is fixed to a camera body (not illustrated in the drawings) and has a substantially annular shape overall. On the other hand, as described above, the fifth group lens holding barrel 15 (second barrel) fixedly holds the fifth lens group 25, and is provided so as to be capable of relative movement in a direction orthogonal to the optical axis O with respect to the aforementioned fixed barrel 20. After alignment is performed by an alignment mechanism that is described later, the fifth group lens holding barrel 15 is placed in a fixed state to maintain the aligned state. The alignment mechanism for that purpose is configured as described hereunder.

As shown in FIG. 2 to FIG. 7, a holding barrel portion in which the fifth lens group 25 is being held of the fifth group lens holding barrel 15 (second barrel) is inserted into and disposed in an opening formed in a substantially center part of the fixed barrel 20 (first barrel). In this case, in a diametrical direction between the fixed barrel 20 (first barrel) and the fifth group lens holding barrel 15 (second barrel), two adjustment member housing portions 36*a* are formed for housing and disposing a plate member for alignment 39 that is an adjustment member for adjusting a relative movement amount of both barrel members (20, 15). The two adjustment member housing portions 36*a* include a wall portion 20*a* on a side of the fixed barrel 20, and convex portions 15*a* on a side of the fifth group lens holding barrel 15 facing the wall portion 20*a*, and are configured so that the adjustment plate 39 is housed and disposed in a state in which the adjustment plate 39 is held between the wall portion 20*a* and the convex portions 15*a*. Note that the aforementioned two adjustment member housing portions 36*a* are formed at positions that are separated from each other in the circumferential direction of the aforementioned two barrel members (20, 15).

In addition, in the diametrical direction between the fixed barrel 20 (first barrel) and the fifth group lens holding barrel 15 (second barrel), on the side of the fixed barrel 20 at a position that is spaced approximately equally from each of the aforementioned two adjustment member housing portions 36*a* in the circumferential direction, a pressing screw 37 that is a countersunk head screw having a tapered face is arranged so that an axial direction of the pressing screw 37 is a parallel direction to the optical axis O. Therefore, a screw hole 20*b* (see FIG. 6) is formed at the same position on the fixed barrel 20 side, and the aforementioned pressing screw 37 is threadedly engaged into the screw hole 20*b*. By disposing the pressing screw 37 in this manner, the pressing screw 37 is disposed at a position facing each of the aforementioned two adjustment member housing portions 36*a*.

A roller 38 that is a rolling member is interposed between the tapered face of the aforementioned pressing screw 37 and an outer circumferential face 15*b* (see FIG. 6) of the fifth group lens holding barrel 15. The roller 38 is formed in a substantially cylindrical shape and is arranged so that the axial direction of the roller 38 is parallel to a face that is orthogonal to the optical axis O and so that an outer circumferential face of the roller 38 makes point contact with the tapered face of the aforementioned pressing screw 37 and the outer circumferential face 15*b* of the fifth group lens holding barrel 15, respectively. That is, the roller 38 is disposed so as to be held between the tapered face of the pressing screw 37 and the outer circumferential face 15*b* of the fifth group lens holding barrel 15. Further, the disposing position of the roller 38 is set so as to be on substantially the same plane as positions at which the respective adjustment plates 39 which are disposed in the aforementioned two adjustment member housing portions 36*a* are disposed, on a plane that is orthogonal to the optical axis O.

According to this configuration, when the pressing screw 37 is threadedly engaged into the screw hole 20*b* and tightened, the tapered face of the pressing screw 37 presses the roller 38 to the optical axis O direction side, and the roller 38 presses the outer circumferential face 15*b* of the fifth group lens holding barrel 15 in the diametrical direction. In this case, as described above, because the pressing screw 37 is disposed at a position facing each of the aforementioned two adjustment member housing portions 36*a*, when the tapered face of the pressing screw 37 presses the fifth group lens holding barrel 15 in the diametrical direction via the roller 38 as a result of tightening of the pressing screw 37, in the fifth group lens holding barrel 15, the respective convex portions 15*a* press the respective adjustment plates 39 at the aforementioned two adjustment member housing portions 36*a*. By this means, gaps between the fifth group lens holding barrel 15 and the adjustment plates 39, and gaps between the adjustment plates 39 and the fixed barrel 20 are eliminated. That is, removal of looseness between the aforementioned two barrel members (20, 15) is performed. By adjusting the number of adjustment plates 39 at this time, or by using different plate thicknesses, alignment (optical axis alignment) of the optical axis O of the fifth lens group 25 of the fifth group lens holding barrel 15 (second barrel) can be performed.

Further, since the disposing positions of the aforementioned roller 38 and the aforementioned adjustment plates 39 are set so as to be on substantially the same plane that is a plane that is orthogonal to the optical axis O, a pressing force with which the roller 38 presses the outer circumferential face 15*b* of the fifth group lens holding barrel 15 is a force that presses the fifth group lens holding barrel 15 in the diametrical direction in a direction orthogonal to the optical axis O. Accordingly, the optical axis O does not tilt when the fifth group lens holding barrel 15 moves in the diametrical direction.

In a state in which looseness has been removed between the two barrel members, namely, the aforementioned fixed barrel 20 and the fifth group lens holding barrel 15, in this manner, the two barrel members are fixed by means of a plurality of screws 36*x* and a washer 36 as a washer member to thereby integrate the two barrel members.

The aforementioned plurality of screws 36*x* are fastening members that are threadedly engaged in a direction parallel to the optical axis O to fasten the aforementioned fixed barrel 20 and the fifth group lens holding barrel 15 at a plurality of fastening portions 36*z*. The aforementioned plurality of fastening portions 36*z* represent locations at which the aforementioned fixed barrel 20 and the fifth group lens holding barrel 15 are integrally fastened by means of the aforementioned plurality of screws 36*x*. Note that, in the present embodiment, the number of the aforementioned plurality of screws 36*x* is taken as three screws, and the number of the plurality of fastening portions 36*z* is taken as three locations.

The washer 36 that is the aforementioned washer member is constituted by a single plate-like member that is formed in a circular arc shape. The washer 36 is arranged so as to be held in an integral manner between the aforementioned plurality of screws 36*x* and the plurality of fastening portions 36*z*.

In the lens barrel 1 of the present embodiment configured in this manner, the aforementioned fixed barrel 20 (first barrel) and the fifth group lens holding barrel 15 (second barrel) are integrally fixed by fastening using the plurality of screws 36*x* at the plurality of fastening portions 36*z* in a state in which the adjustment plates 39 (adjustment members) are housed in the adjustment member housing portions 36*a* between the two barrel members (20, 15).

In this case, the roller 38 (rolling member) and the pressing screw 37 (countersunk head screw) are provided to eliminate gaps between the adjustment plates 39 (adjustment members) and the aforementioned fixed barrel 20 (first barrel), and gaps between the adjustment plates 39 (adjustment members) and the fifth group lens holding barrel 15 (second barrel). The pressing screw 37 (countersunk head screw) is disposed in the screw hole by being threadedly engaged in the screw hole in a direction parallel to the optical axis O on the fixed barrel 20 side. The pressing screw 37 (countersunk head screw) has a tapered face. The roller 38 (rolling member) is interposed between the tapered face of the pressing screw 37 and the outer circumferential face 15*b* of the fifth group lens holding barrel 15 and disposed in that position. According to this configuration, when the pressing screw 37 is fastened, the tapered face of the pressing screw 37 presses the fifth group lens holding barrel 15 (second barrel) in the diametrical direction via the roller 38 to thereby remove looseness between the two barrel members (20, 15).

In this state, the aforementioned two barrel members (20, 15) are integrally fastened and fixed using the aforementioned plurality of screws 36*x* in a manner in which the washer 36 is held between the two barrel members (20, 15).

As described in the foregoing, according to the above one embodiment, as a mechanism for removing looseness and performing alignment (optical axis alignment) between the fixed barrel 20 (first barrel) and the fifth group lens holding barrel 15 (second barrel), a configuration is adopted that uses the pressing screw 37 that is constituted by a countersunk head screw, and in which the roller 38 (rolling member) is interposed between the tapered face of the pressing screw 37 and the outer circumferential face 15*b* of the fifth group lens holding barrel 15 (second barrel) as the barrel to be aligned. According to this configuration, a pressing force in the axial direction (thrust direction) of the pressing screw 37 is applied only perpendicularly at the circumferential face of the fifth group lens holding barrel 15 via the roller 38, that is, is converted to a force in the diametrical direction of the barrel and is reliably applied only in the diametrical direction of the barrel, and without a force of a rotational displacement of the pressing screw 37 being applied to the circumferential face of the fifth group lens holding barrel 15, and hence a positional deviation of the fifth group lens holding barrel 15 is not caused. Accordingly, by this means the fifth group lens holding barrel 15 can be reliably fixed at the position where alignment (optical axis alignment) was performed.

Further, when fastening and fixing the two barrel members (20, 15) at the plurality of fastening portions 36*z* using the plurality of screws 36*x* after alignment (optical axis alignment), the single washer 36 is held and fixed between the two barrel members (20, 15). Therefore, according to this configuration, moments caused by tightening of the plurality of screws 36*x* for fixing can be cancelled.

Thus, after performing alignment between the fixed barrel 20 (first barrel) and the fifth group lens holding barrel 15 (second barrel), reliable fixing of that state can be realized by means of an extremely simple configuration.

Note that, in the present embodiment, although a configuration is adopted in which both of the first barrel and the second barrel have a lens group constituting a lens, the first barrel and the second barrel do not necessarily need to have those lens groups, and a configuration may be adopted that aligns the two barrels that do not have a lens group, and the present invention can be similarly applied even in a case where only one of the first barrel and the second barrel has a lens group.

Further, although the present embodiment is described taking as an example a lens barrel that is applied to a so-called "interchangeable lens-type camera" as one form of a lens barrel that applies the present invention, the form of a lens barrel to which the present invention can be applied is not limited to this example. For example, the present invention can be applied in exactly the same way to a lens barrel in a so-called "integrated lens-type camera" or the like in which a lens barrel and a camera body are integrated.

The present invention is not limited to the above-described embodiment, and naturally various modifications and applications can be implemented within a range that does not deviate from the gist of the present invention. Further, the above described embodiment includes inventions of various stages, and various inventions can be extracted by appropriately combining a plurality of the disclosed configuration requirements. For example, if the problem to be solved by the invention can be solved and the effects of the invention obtained even when some of the configuration requirements are omitted from the entire configuration requirements shown in the above-described one embodiment, then the configuration obtained by omitting the configuration requirements can be extracted as an invention. Furthermore, components from different embodiments may be appropriately combined. The present invention is not limited by a specific embodiment other than that the invention is limited by the accompanying claims.

In addition to being applied to an image pickup apparatus such as a camera, the lens barrel of the present invention can also be widely applied to various kinds of electronic equipment with an image pickup function, such as various kinds of electronic devices equipped with an image pickup function, for example, cellular phones, smartphones, electronic notepads, electronic dictionaries, portable information terminals, personal computers, tablet-type terminal devices, game devices, televisions, watches, and navigation apparatuses that use GPS (global positioning system).

What is claimed is:
1. A lens barrel, comprising:
a first barrel;
a second barrel that, with respect to the first barrel, is capable of relative movement in a direction orthogonal to an optical axis;
an adjustment plate for adjusting an amount of the relative movement;
two adjustment plate housings that are provided in a diametral space between the first barrel and the second barrel, are formed so as to be separate from each other in a circumferential direction and are capable of housing the adjustment plate;
a plurality of screws,
a plurality of fasteners for threadedly engaging and fastening the first barrel and the second barrel in parallel with the optical axis by means of the plurality of screws; and
one washer member that is held in an integral manner between the plurality of screws and the plurality of fasteners, wherein:
in order to press the second barrel in a diametrical direction by causing a rolling member to be interposed to eliminate a gap between the adjustment plate and the first barrel and a gap between the adjustment plate and the second barrel at a time that the adjustment plate is housed in one of the adjustment plate housings and the lens barrel is fastened with the plurality of screws, the rolling member is pressed by a tapered face of a countersunk head screw that is threadedly engaged in a parallel direction to the optical axis.

2. The lens barrel according to claim 1, wherein at least one of the first barrel and the second barrel has a lens group.

3. The lens barrel according to claim 1, wherein at least one of the first barrel and the second barrel has a lens group.

4. A lens barrel, comprising:
a first barrel;
a second barrel that, with respect to the first barrel, is capable of relative movement in a direction orthogonal to an optical axis;
an adjustment plate for adjusting an amount of the relative movement;
two adjustment plate housings that are provided in a diametral space between the first barrel and the second barrel, are formed so as to be separate from each other in a circumferential direction and are capable of housing the adjustment plate;
a plurality of screws,
a plurality of fasteners for threadedly engaging and fastening the first barrel and the second barrel in parallel with the optical axis by means of the plurality of screws; and
one washer member that is held in an integral manner between the plurality of screws and the plurality of fasteners,
wherein the one washer member comprises a plate-shaped member that is formed in a circular arc shape, and
wherein in order to press the second barrel in a diametrical direction by causing a rolling member to be interposed to eliminate a gap between the adjustment plate and the first barrel and a gap between the adjustment plate and the second barrel at a time that the adjustment plate is housed in one of the adjustment plate housings and the lens barrel is fastened with the plurality of screws, the rolling member is pressed by a tapered face of a countersunk head screw that is threadedly engaged in a parallel direction to the optical axis.

5. The lens barrel according to claim 4, wherein at least one of the first barrel and the second barrel has a lens group.

6. The lens barrel according to claim 4, wherein at least one of the first barrel and the second barrel has a lens group.

7. A lens barrel, comprising:
a first barrel;
a second barrel that, with respect to the first barrel, is capable of relative movement in a direction orthogonal to an optical axis;
an adjustment member for adjusting an amount of the relative movement;
two adjustment member housing portions that are provided in a diametral space between the first barrel and the second barrel, are formed so as to be separate from each other in a circumferential direction and are capable of housing the adjustment member;
a plurality of screws,
a plurality of fastening portions for threadedly engaging and fastening the first barrel and the second barrel in parallel with the optical axis by means of the plurality of screws; and
one washer member that is held in an integral manner between the plurality of screws and the plurality of fastening portions,
wherein in order to press the second barrel in a diametrical direction by causing a rolling member to be interposed to eliminate a gap between the adjustment member and the first barrel and a gap between the adjustment member and the second barrel at a time that the adjustment member is housed in one of the adjustment member housing portions and the lens barrel is fastened with the plurality of screws, the rolling member is pressed by a tapered face of a countersunk head screw that is threadedly engaged in a parallel direction to the optical axis.

8. The lens barrel according to claim 7, wherein at least one of the first barrel and the second barrel has a lens group.

9. A lens barrel, comprising:
a first barrel;
a second barrel that, with respect to the first barrel, is capable of relative movement in a direction orthogonal to an optical axis;
an adjustment member for adjusting an amount of the relative movement;
two adjustment member housing portions that are provided in a diametral space between the first barrel and the second barrel, are formed so as to be separate from each other in a circumferential direction and are capable of housing the adjustment member;
a plurality of screws,
a plurality of fastening portions for threadedly engaging and fastening the first barrel and the second barrel in parallel with the optical axis by means of the plurality of screws; and
one washer member that is held in an integral manner between the plurality of screws and the plurality of fastening portions,
wherein the one washer member comprises a plate-shaped member that is formed in a circular arc, and
wherein in order to press the second barrel in a diametrical direction by causing a rolling member to be interposed to eliminate a gap between the adjustment member and the first barrel and a gap between the adjustment member and the second barrel at a time that the adjustment member is housed in one of the adjustment member housing portions and the lens barrel is fastened with the plurality of screws, the rolling member is pressed by a tapered face of a countersunk head screw that is threadedly engaged in a parallel direction to the optical axis.

10. The lens barrel according to claim 9, wherein at least one of the first barrel and the second barrel has a lens group.

* * * * *